Sept. 22, 1925.  
L. V. KAMPER  
1,554,215  
AIR BRAKE FOR AUTOMOBILES  
Filed June 27, 1921  
2 Sheets-Sheet 1
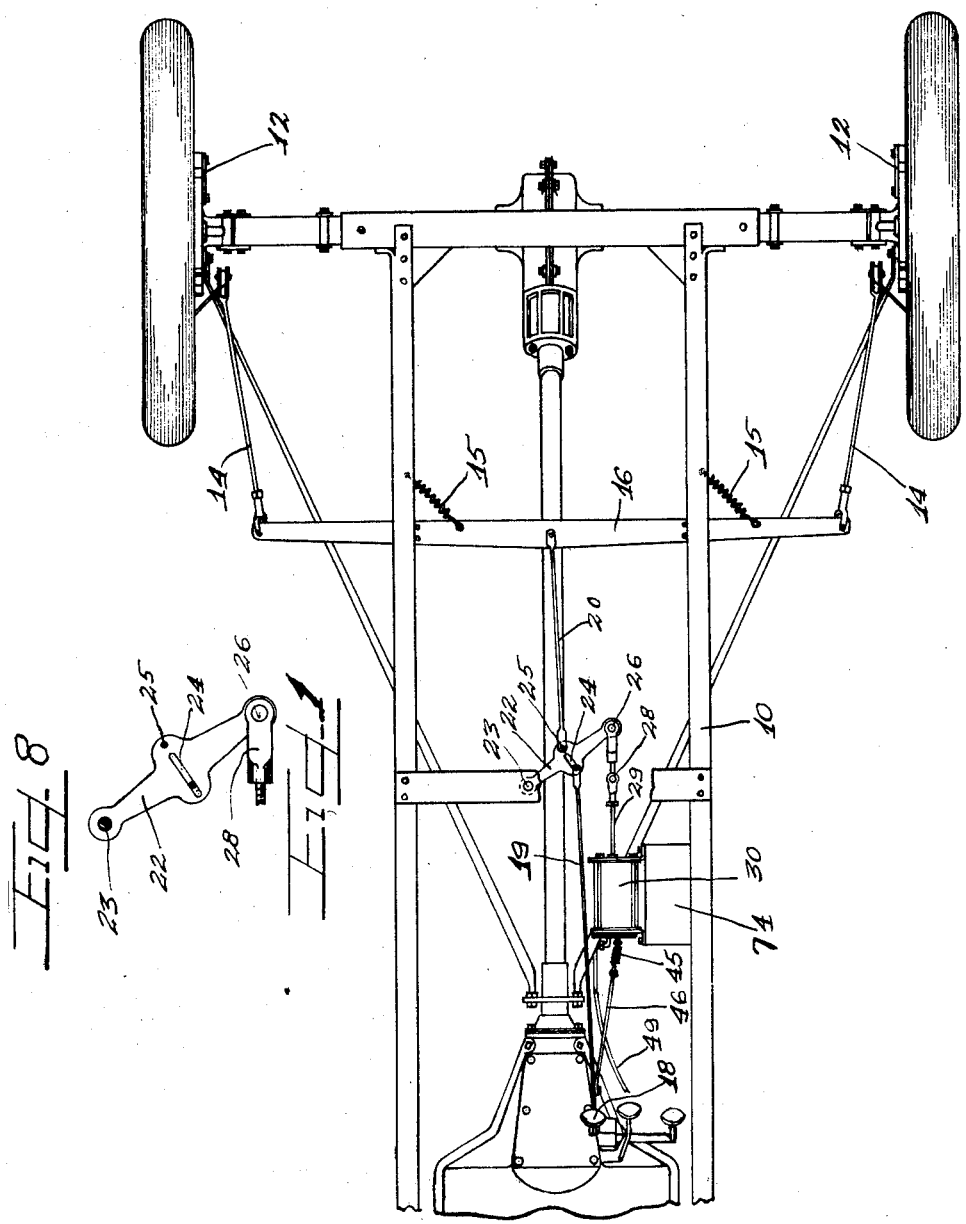

Sept. 22, 1925.                      1,554,215
L. V. KAMPER
AIR BRAKE FOR AUTOMOBILES
Filed June 27, 1921       2 Sheets-Sheet 2
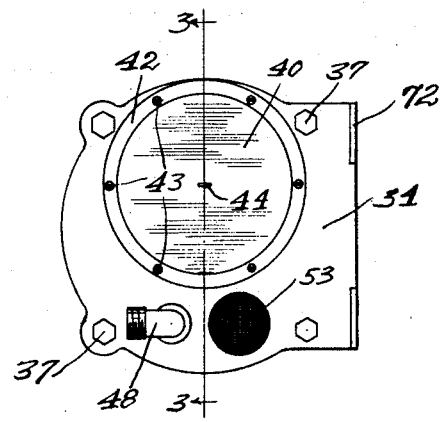
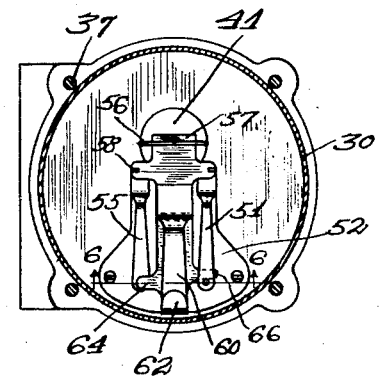
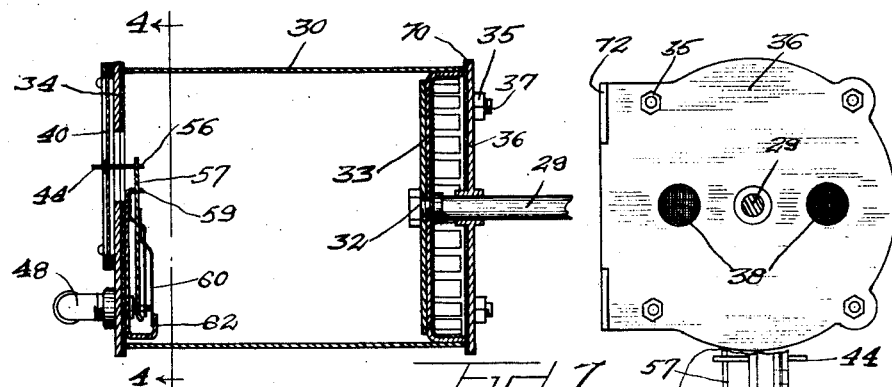
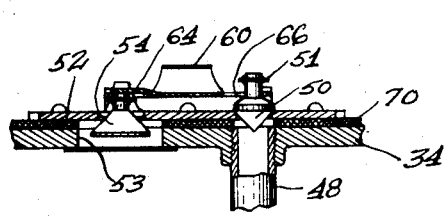
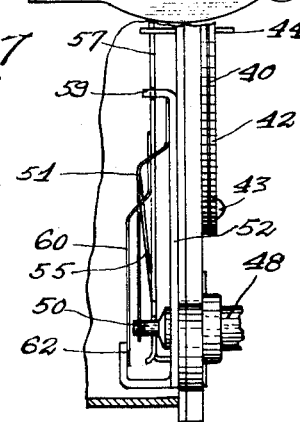
Inventor
LLOYD V. KAMPER.
By Charles W. Hills
Atty.

Patented Sept. 22, 1925.

1,554,215

UNITED STATES PATENT OFFICE.

LLOYD V. KAMPER, OF CHICAGO, ILLINOIS.

AIR BRAKE FOR AUTOMOBILES.

Application filed June 27, 1921. Serial No. 480,551.

*To all whom it may concern:*

Be it known that I, LLOYD V. KAMPER, a citizen of the United States, and a resident of the city of Chicago, in the county of Cook and State of Illinois, have invented certain new and useful Improvements in an Air Brake for Automobiles; and I do hereby declare that the following is a full, clear, and exact description of the same, reference being had to the accompanying drawings, and to the numerals of reference marked thereon, which form a part of this specification.

This invention relates to improvements in brakes for automobiles and has for its main object the provision of an attachment for such a brake operated by air pressure or suction so that the brake itself will be automatically set without manual application of the great pressure upon the foot pedal now necessary in order to apply the brakes commonly in use on an automobile.

One of the principal objects of this invention is the provision of brake means for automobiles wherein the pressure necessary to set the brakes will be automatically applied by suction from a continuously operated suction mechanism whenever a slight pressure or forward movement is put upon the ordinary brake lever.

Another object of this invention is the provision of an air brake for automobiles which can be readily applied to any automobile and which comprises a minimum of parts so that the same is not likely to get out of order.

A still further important object of this invention is the provision of an air brake device for automobiles adapted to be attached to co-operate with the ordinary brake lever and which consists of a piston operated by suction to automatically set the brake whenever a slight pressure is applied to the brake lever, said suction means including a compensating device wherein the pressure upon the brakes themselves may be governed by the movement of the brake lever, and the resulting motion of the piston.

Another and further important object of this invention is the provision of an air brake for automobiles constructed in such a manner and attached to the ordinary brake means, so that in the event of its getting out of order and becoming inoperative, the ordinary brake means is still in position on the machine and ready to be operated at an instant's notice; in fact, the ordinary brake means is always operable.

Other and further important objects of the invention will be apparent from the disclosures in the accompanying drawings and following specification.

The invention (in a preferred form) is illustrated in the drawings and hereinafter more fully described.

On the drawings:

Figure 1 represents a plan view of the chassis of an automobile showing the improved air brake of this invention applied thereto.

Figure 2 is a front end view of the cylinder containing the air brake mechanism.

Figure 3 is a section taken on the line 3—3 of Figure 2.

Figure 4 is a sectional view taken on the line 4—4 of Figure 3, looking in the direction indicated by the arrows.

Figure 5 is a rear view of the cylinder containing the air brake mechanism.

Figure 6 is a sectional view taken on the line 6—6 of Figure 4.

Figure 7 is a detail view showing the construction of the means for operating the valves and the pressure compensating diaphragm.

Figure 8 is a detail view of the lever for connecting the air brake piston to the ordinary brake operating means.

As shown on the drawings:

The reference numeral 10 indicates the chassis or frame of an automobile having the usual brakes 12, brake rods 14, springs 15, equalizing lever 16, and brake pedal 18. The rearwardly extending rod from the foot pedal 18 to the equalizing bar 16 is made in two parts 19 and 20, as shown in Figure 1, and connecting them is the lever 22 forming part of the means by which the air brake mechanism of this invention is applied to the brake operating mechanism. The lever 22 is pivoted at 23 to a suitable extension on the frame and has its middle portion made in an enlarged circular form as shown, having a slot 24 therein, within which slides a pin adapted for connecting the end of the rod or connecting member 19 thereto. A slight amount of play is allowed between this pin and the end of the slot 24. A pivot hole 25 is provided in alinement with the slot 24 for connecting one end of the rod 20 to the lever 22. The free end of the lever 22 has pivoted thereto at 26 a link member 28, the length of which may be made adjustable by means of a screw and bolt connection which is ordinarily in use. This link 28 is connected to a piston rod 29 extending into the cylinder 30 and terminating in a piston 32, as best shown in Figure 3. This piston 32 may be made in any desired form, preferably having a plate 33 held in position by a bolt or nut and pressing down upon the inner member of the piston head a facing of leather or some other flexible material so that the same may always co-operate with the sides of the cylinder 30 in an air-tight relation thereto. The cylinder 30 is provided with front and rear plates 34 and 36 respectively, held in air-tight relation to the cylinder by means of nuts 35 on long bolts 37, as shown. Provided in the rear plate 36 of the cylinder are two openings 38, adapted to admit air to the interior thereof to allow the free operation of the piston 32. These openings are preferably covered with wire gauze or the like in order to prevent the entry of any dirt, dust or other foreign material into the interior of the cylinder.

Fixed to cover an opening 41 in the front plate 34 of the cylinder is a flexible diaphragm 40 comprising a thin disk of brass or some other suitable material, held in position thereon by means of a ring 42 and screws 43. To the center of the diaphragm 40 is attached a hook or the like 44 by means of which the same may be attached to a coiled spring 45, Figure 1, having its other end fixed to a rod 46 which is in turn attached to the foot pedal of the brake lever. A suction pipe 48 passes through the plate 34 communicating with the interior of the cylinder and is connected by means of the pipe 49 to the Venturi tube or intake manifold on the carbureter of the automobile motor. A valve 50 is positioned in the suction pipe 48, as best shown in Figure 6. This valve 50 is releasably held in its socket in closed position by means of a leaf spring 51 having its end attached to the top stem of the valve as shown in Figure 7, the other end of the leaf spring 51 being fixed to a plate or bracket member 52 attached to the interior of the plate 34.

An intake opening 53 for atmospheric air is provided in the plate 34, and this is covered with a piece of gauze of fine wire or the like. Positioned in this intake opening is a vent valve 54 held normally in open position by means of a leaf spring 55, likewise mounted on the base 52. This spring is best shown in Figure 4. The hook member 44 attached to the center of the diaphragm 40 extends therethrough and passes through the opening 41 terminating in a plate 56 having a slot therein adapted to co-operate with the end of a lever 57 pivoted at 58 on upstanding lugs 59 integral with the bracket or base plate 52. The free end of the lever 57 is held in downward position by means of a leaf spring 60 attached thereto and having its end co-operating with the rearwardly turned end of a lug 62 upstanding from the base plate 52 and integral therewith, as best shown in Figure 7. The forward end of the pivoted lever 57 immediately underneath the spring 60 has two laterally extending arms 64 and 66, as best shown in Figure 4. The arm 64 extends over the spring member 55 and operates to normally maintain the valve 54 held down in open position. The arm 66 extends under the leaf spring 51, which normally holds the valve 50 closed and operates to open the suction when the free end of the arm 57 is moved outwardly against the tension of the leaf spring 60. Suitable packing material 70, such as rubber or the like, may be inserted between the plates 34 and 36, and the ends of the cylinder 30, to provide air-tight joints, and lugs integral with the plates 34 and 36, as designated at 72, and outwardly bent are provided for base or like members by means of which the cylinder may be readily attached by bolts, screws or the like to a convenient extension on the chassis of the machine 10, as illustrated at 74 in Figure 1.

The operation is as follows:

Whenever it is desired to apply the brakes a slight pressure is put upon the brake pedal 18. The lever or rod 46 connecting the brake lever 18 to the spring 45 mounted on the diaphragm 40 of the cylinder 30 is first moved as there is sufficient play between the end of the rod 19 and the slot 24 to allow its motion in the slot without causing any manual operation of the brake equalizing arm 16. This amount of free play or lost motion is best shown in Figure 8. The consequent pull upon the spring 45 exerts an outward tension upon the diaphragm 40 by means of the connecting hook 44. This connecting hook 44 extends through the diaphragm in an air-tight manner and terminates in the plate 56 having a slot within which fits the end 57 of the pivoted arm 57—64—66, which is pivoted at 58 on the upstanding lugs 59 of the bracket 52. It will be evident that a very slight motion of the hook member 44 will be sufficient to impart quite considerable movement to the end 64—66 of the lever on account of the position of the fulcrum 58. The first result of this motion is to make the end of the arm 64 release its contact with the leaf spring 55 thereby allowing it to rise and pull the attached valve member 54 into upward position closing the atmospheric opening 53 in the plate 34. After this opening has been closed, further motion of the lever 57—64—66 operates to have the arm 66 lift up the leaf spring 51 and its attached valve 50, thereby opening the suction valve and allowing suction to be communicated to the interior of the cylinder 30, through the pipe 48—49 leading to the intake manifold of the motor. This suction is sufficient to make the piston 32 advance into the cylinder 30 and this piston by means of its connection 28—29 and the pivot point 26 on the lever 22 operates the equalizing bar 16 by means of the lever 20 to set the brakes. It will be evident that usually when the brakes are to be applied, the engine throttle has been closed, thereby providing a suction in the intake manifold more than sufficient to operate the piston 32.

It will be seen that the piston 32 is normally held in retracted position by means of its connection with the brake levers 14 and 16 and the springs 15 which maintain the brake in free position, and that the openings 38 in the rear plate 36 of the cylinder 30 allow free motion of the piston 32 within the cylinder both backward and forward. The suction on the interior of the cylinder 30 operating on the piston 32, also acts upon the inner face of the diaphragm 40 thereby acting to compensate to a degree the pull exerted by the rod 46 together with the spring 45 upon the outer face of the diaphragm 40, thus thereby automatically regulating the pressure put upon the brakes by means of the piston 32, which action is slowed down to a degree corresponding to the suction exerted upon the interior face of the diaphragm 40. This results in a very uniform but positive action upon the brakes and it will be evident that by the use of this attachment the brakes of an automobile may be operated with a very slight pressure upon the brake lever which makes it especially adaptable for driving in crowded traffic where the brake must be often and vigorously applied at times.

This invention will also be particularly useful in the case of women drivers who have difficulty at times in reaching the brake pedal or persons of short stature who have been compelled to revert to all sorts of devices, such as cushions upon the seat, to allow of a positive application of the brake when needed. Furthermore, it will be evident that in case this device becomes inoperative for any reason the ordinary brake means is still effective as the original connection to the brakes of the automobile have not in any way been disturbed.

The simplicity of this apparatus and the relatively small number of parts render it very efficient in operation and unlikely to get out of order, whereby a highly satisfactory brake attachment is obtained. Moreover, this device operates in such a manner as to be more positively and quickly operated than the ordinary brake means, as the operator of the machine has merely to push lightly on the foot pedal to have the brakes applied, and it will be found that after the brake pedal has been pushed the brakes will be applied with a rapidity not to be equalled by the manual operation of the same.

I am aware that many changes may be made and numerous details of construction varied through a wide range without departing from the principles of this invention, and I therefore do not purpose limiting the patent granted hereon, otherwise than necessitated by the prior art.

I claim as my invention:

1. An air brake attachment for automobiles including a cylinder, a piston therein, suction means for operating said piston, said suction means including a suction valve and a connection from said valve to the intake manifold of the automobile engine, and means for opening the suction valve comprising a diaphragm, a lever connected thereto normally spring-pressed into valve closing position, and a flexible attachment connecting the middle of said diaphragm to the brake operating lever.

2. An air brake attachment for automobiles including a cylinder, a piston slidable therein, plates on each end of the cylinder provided with openings to admit atmospheric air to either face of the piston, a valve for applying suction to the front face of the piston, and a vent valve in the opening admitting atmospheric air to the front face of the piston, said suction valve and vent valve being operated in succession.

3. An air brake attachment for automobiles including a cylinder, a piston slidable therein, plates on each end of the cylinder provided with openings to admit atmospheric air to either face of the piston, a valve for applying suction to the front face of the piston, a vent valve in the opening admitting atmospheric air to the front face of the piston, said suction valve and vent valve being operated in succession, and a diaphragm in the front plate of the cylinder having the valve operating lever passing through the center thereof, said diaphragm acting to compensate the suction inside the cylinder for the purpose of controlling the valves and applying the brakes in a gradual manner.

4. In an air brake for automobiles, the combination of a cylinder, a piston slidable therein, a spring pressed suction valve normally maintained in closed position, a spring pressed vent valve normally maintained in open position, means connected to the brake pedal of the automobile for first closing the vent valve and then opening the suction valve, and means responsive to the degree of suction adapted to decrease the movement of said last mentioned means.

5. In an air brake for automobiles, the combination of a cylinder, a piston slidable therein, a spring pressed suction valve normally maintained in closed position, a spring pressed vent valve normally maintained in open position, and means connected to the brake pedal of the automobile for first closing the vent valve and then opening the suction valve, said means including a pivoted lever having its free end cooperating with the heads of said valves, a pressure compensating diaphragm covering an opening in the front face of the cylinder, a hook passing through said diaphragm to which the other end of said pivoted lever is connected, and a spring between the diaphragm and brake pedal.

6. In an air brake for automobiles, the combination of a cylinder, a piston slidable therein, a spring pressed suction valve normally maintained in closed position, a spring pressed vent valve normally maintained in open position, and means connected to the brake pedal of the automobile for first closing the vent valve and then opening the suction valve, said means including a pivoted lever having its free end cooperating with the heads of said valves, a pressure compensating diaphragm in an opening in the front face of the cylinder, a connection from said diaphragm to the other end of said pivoted lever, and a spring connection between the diaphragm and brake pedal, said diaphragm acting to exert a compensating action on the suction inside the cylinder by slowing up the action of the suction applying valve when the same is opened.

7. In an air brake attachment for automobiles, the combination of a suction operated piston, valves for controlling the same, a piston rod, a lever connected to the end of the piston rod, a brake operating rod connected to the middle of said lever, a brake pedal, a lost motion connection between said pedal and lever, and a direct connection between said pedal and piston control valves.

8. In an air brake attachment for automobiles, the combination of a suction operated piston, valves for controlling the same, a piston rod, a lever connected to the end of the piston rod, a brake operating rod connected to the middle of said lever, a brake pedal, a lost motion connection between said pedal and lever, and a direct connection between said pedal and piston control valves to permit of the operation of said valves to apply suction to the face of the piston before the manual operation of the brakes.

9. In combination with an air brake attachment for automobiles, a suction operated piston, means for allowing suction to be applied to the face of said piston, comprising a suction valve, means for admitting atmospheric air to the face of said piston comprising a vent valve communicating with the outside air, a single means for operating said suction valve and vent valve in succession, and means responsive to the degree of suction for modifying the movement of said last mentioned means.

10. In combination with an air brake attachment for automobiles, a suction operated piston, means for allowing suction to be applied to the face of said piston comprising a suction valve, a vent valve for the face of said piston, and a single means for operating said suction valve and vent valve in succession, said means including a pivoted lever and a suction compensating diaphragm connected with the interior of the cylinder and controlling said lever.

11. In combination with an air brake attachment for automobiles, a suction operated piston, means for allowing suction to be applied to the face of said piston comprising a suction valve, a vent valve for the face of said piston, and a single means for operating said suction valve and vent valve in succession, said means including a pivoted lever acting through a suction compensating diaphragm connected with the interior of the cylinder, and spring means connecting the outer face of said diaphragm to the brake pedal for operation of the valves.

In testimony whereof I have hereunto subscribed my name.

LLOYD V. KAMPER.